United States Patent Office 3,229,945
Patented Jan. 18, 1966

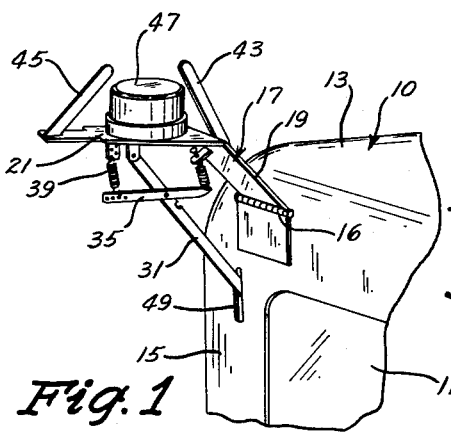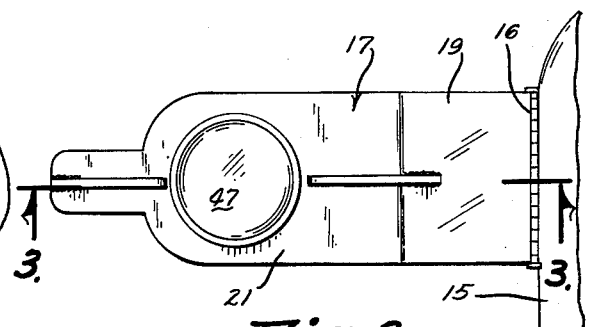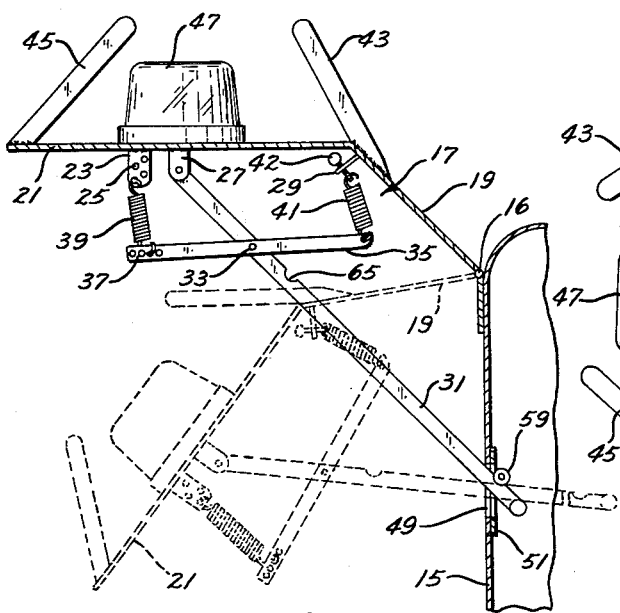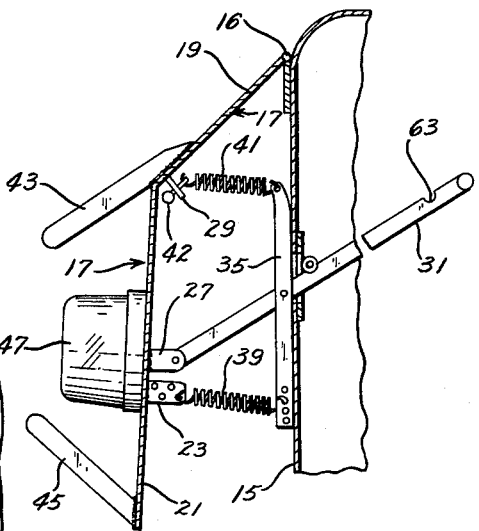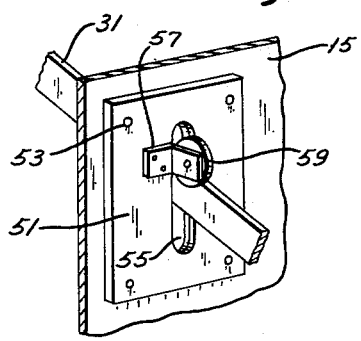

3,229,945
AUTOMATIC RELEASE BRACKET FOR EMERGENCY WARNING LIGHTS
Harold A. Hartman, 720 E. Bremer, Waverly, Iowa
Filed Aug. 20, 1964, Ser. No. 390,902
17 Claims. (Cl. 248—286)

This invention relates to a bracket for an emergency warning light and more particularly to a bracket for an emergency warning light which automatically pivots downwardly when struck by an obstruction to prevent damage to the emergency light.

Emergency warning lights are usually required by law to be attached to the upper portion of highway maintenance vehicles. These vehicles are sometimes rather high vehicles and the positioning of emergency warning lights on the upper portion thereof frequently causes difficulty in driving the vehicles into buildings or the like. Grading vehicles frequently come into contact with tree branches or the like which can also cause damage to the emergency warning light. When the emergency warning lights come into contact with a building or some other obstruction, the usual result is the breakage of the expensive light. Telescoping brackets have been devised to raise or lower emergency warning lights but these brackets must be raised or lowered by hand each time it is feared that the light will come into contact with an obstruction. If the vehicle operator forgets about the light or fails to notice the obstruction, the light will be damaged together with the telescoping bracket.

Therefore, it is a principal object of this invention to provide a bracket for an emergency warning light that will automatically pivot downwardly to a safe position when struck by an obstruction.

A further object of this invention is to provide a bracket for an emergency warning light which may be pivoted downwardly to a safe position by the vehicle operator without leaving the cab of the vehicle.

A further object of this invention is to provide a bracket for an emergency warning light which may be locked in a downward pivoted position.

A further object of this invention is to provide a bracket for an emergency warning light which may be raised or lowered by the operator from within the vehicle cab.

A further object of this invention is to provide a bracket for an emergency warning light which permits the emergency warning light to continue to operate although in a downward pivoted position.

A further object of this invention is to provide a bracket for an emergency warning light which is counterbalanced by springs and levers to permit the operator to easily raise and lower the emergency warning light.

A still further object of this invention is to provide a bracket for an emergency warning light which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a partial perspective view of the device mounted on the rearward portion of a vehicle cab in the upward pivoted position;

FIG. 2 is a top elevational view of the device in the position as seen in FIG. 1;

FIG. 3 is a sectional view of the device as seen on line 3—3 of FIG. 2 at a reduced scale illustrating the manner in which the bracket pivots downwardly;

FIG. 4 is a sectional view of the device illustrating the bracket in its extreme downward pivoted position; and FIG. 5 is a fragmentary perspective view as seen from the interior of the vehicle cab illustrating the manner in which the elongated lever is yieldably locked into position.

The numeral 10 generally designates a vehicle having a cab 11 including a roof 13 and rear wall 15. Hingedly secured to the upper end of rear wall 15 by means of hinge 16 is a bracket 17 having a normally inclined portion 19 and a horizontal portion 21 extending rearwardly from the upper end thereof.

Secured to the bottom surface of horizontal portion 21 by welding or the like and extending downwardly therefrom is an arm member 23 having a plurality of staggered holes 25 formed therein. Also secured to the bottom surface of horizontal portion 21 by welding or the like is an arm member 27 which extends downwardly therefrom at a point forwardly of arm member 23. Secured to the rearward surface of inclined portion 19 adjacent its upper end by welding or the like is an arm member 29 extending downwardly and rearwardly therefrom.

An elongated lever 31 is vertically pivotally secured to the lower end of arm member 27 by means of a pin member and extends downwardly and forwardly therefrom. A shorter lever 35 is vertically pivotally secured intermediate its length thereof to lever 31 as seen in FIGS. 1, 3 and 4. The rearward end of lever 35 has a plurality of aligned holes 37 formed therein as seen in FIGS. 1, 3 and 4.

A spring 39 extends between arm member 23 and lever 35 and has one end thereof secured to one of holes 25 and its other end secured to one of holes 37. A spring 41 extends between arm member 29 and lever 35 and has one end thereof secured to the forward end of lever 35 and its other end secured to an adjusting screw means 42 which extends through arm member 29.

A guard member 43 is secured to the forward surface of inclined portion 19 by welding or the like and extends upwardly and rearwardly therefrom as best seen in FIG. 3. A guard member 45 is secured to the top surface of horizontal portion 21 by welding or the like and extends upwardly and rearwardly therefrom as seen in FIG. 3.

A conventional rotating emergency warning light is secured to the top surface of horizontal portion 21 by any convenient means between guard members 43 and 45.

The lower end of lever 31 extends through slot 49 in rear wall 15 as seen in FIGS. 3, 4 and 5. A plate 51 is secured to the interior surface of wall 15 by means of screws 53 or the like and has a slot 55 formed therein which registers with slot 49 and which receives lever 31 as seen in FIG. 5. An L-shaped bracket 57 is secured to plate 51 and has a roller 59 vertically rotatably secured thereto, the periphery of which engages the upper edge portion 61 of lever 31. Upper edge portion 61 of lever 31 is provided with a semi circular notch 63 adjacent its lower end and a semi circular notch 65 intermediate its length.

The normal method of operation is as follows. The device would normally assume the position seen in FIG. 1. In this position, roller 59 would be in engagement with notch 63 in lever 31 to yieldably maintain bracket 17 in an "up" position. The tension of spring 41 tends to pull the forward end of lever 35 upward and as a result, lever 31 also exerts pressure on roller 59 so that a downward force must be exerted on bracket 17 to cause roller 59 to disengage from notch 63. The operator may lower bracket 17 as desired by simply grasping the lower end of lever 31 and moving lever 31 into cab 11 thereby pivoting bracket 17 downwardly into the position seen in FIG. 4.

In this position, roller 59 will be in engagement with notch 65 in lever 31 to prevent undesirable movement of the device when in a downward pivoted position. This position allows the vehicle to enter buildings or the like without damaging warning light 47. Warning light 47 is moved to an upward pivoted position by simply moving lever 31 outwardly through slot 49 in wall 15 until roller 59 once again engages notch 63.

If the operator forgets to lower warning light 47 or if an obstruction is encountered, the device will automatically pivot downwardly out of harm's way. This is accomplished by the provision of guards 43 and 45. When an obstruction engages guard 43 as the vehicle is moving forwardly, downward pressure will be exerted on bracket 17 which will cause notch 63 on lever 31 to move out of engagement with roller 59 thereby permitting bracket 17 and light 47 to move to the position seen in FIG. 4. The same results will occur when the device is moving rearwardly and guard member 45 strikes an obstruction.

The device may be lowered or raised with ease due to springs 39 and 41 counteracting the weight of the device. It is obvious that warning light 47 extends above the top of cab 11 to comply with highway regulations. The device can be fitted to any different types of vehicles such as motor graders, trucks, snowplows, tractors or the like.

Holes 25 in arm member 23 and holes 37 in arm member 35 permit adjustment of spring 39 to compensate for the different weights of various warning lights.

Adjusting screw 42 also provides a convenient means for adjusting spring 41 to compensate for the different weights of various warning lights.

Thus from the foregoing it can be seen that the device accomplishes at least all of its stated objectives.

Some changes may be made in the construction and arrangement of my Automatic Release Bracket for Emergency Warning Lights without departing from the real spirit and purpose of my invention, and it is my intention to cover by my claims, any modified forms of structure or use of mechanical equivalents which may be reasonably included within their scope.

I claim:

1. In a bracket for an emergency warning light,
a plate member having top and bottom surfaces, rearward and forward ends, pivotally secured at its forward end to a support means,
a means operatively connected to said plate member to yieldably prevent its pivotal movement with respect to said support means,
a first lever operatively pivotally connected at one of its ends to the bottom surface of said plate member and extending downwardly and forwardly towards said support means,
a second lever having rearward and forward ends pivotally secured intermediate its length to said first lever intermediate the length thereof,
a first resilient means operatively connected to and extending between the rearward end of said second lever and said plate member,
a second resilient means operatively connected to and extending between the forward end of said second lever and said plate member,
and a means operatively connected to said support means engaging said first lever to yieldably resist the pivotal movement of said plate member with respect to said support means.

2. The device of claim 1 wherein a guard member is secured to the top surface of said plate member which extends upwardly and rearwardly therefrom.

3. The device of claim 1 wherein said plate member is adapted to detachably receive a light means on its top surface and a guard member is secured to the top surface of said plate member forwardly of said light means which extends upwardly and rearwardly therefrom.

4. The device of claim 1 wherein said plate member is adapted to detachably receive a light means on its top surface and a first guard member is secured to the top surface of said plate member forwardly of said light means which extends upwardly and rearwardly therefrom; said plate member having a second guard member secured to the top surface thereof rearwardly of said light means which extends upwardly and forwardly therefrom.

5. The device of claim 1 wherein said first and second resilient means are adapted to counterbalance the weight of said plate member and emergency warning light.

6. The device of claim 1 wherein the means to yieldably resist the pivotal movement of said plate member with respect to said support means includes a roller cam means rotatably secured to said support means adapted to engage a notch in said first lever at times.

7. The device of claim 1 wherein the rearward end of said second lever has a plurality of holes each of which are adapted to receive one end of said first resilient means at times.

8. The device of claim 1 wherein said plate member has an adjusting screw means secured thereto which receives one end of said second resilient means.

9. The device of claim 7 wherein the other end of said first resilient means is vertically adjustably operatively secured to said plate member.

10. In combination,
a vehicle having a cab with a rear wall,
a plate member comprised of an inclined member pivotally secured at its lower end to said rear wall and a normally horizontal portion extending rearwardly, with respect to said cab, from the upper end of said inclined portion,
said inclined portion having rearward and forward surfaces with respect to said cab,
said horizontal portion having top and bottom surfaces,
a first arm member secured to and extending downwardly from the bottom surface of said horizontal portion,
a second arm member secured to and extending downwardly from the bottom surface of said horizontal portion forwardly of said first arm member,
a third arm member secured to and extending rearwardly and downwardly from the rearward surface of said inclined portion,
a first elongated lever pivotally secured at one of its ends to said second arm member and extending downwardly and forwardly therefrom, said forward end of said first lever being slidably received by an elongated vertical slot in said rear wall,
a second elongated lever pivotally secured intermediate its length to said first lever intermediate the length thereof and having rearward and forward ends,
a first spring member secured to and extending between said first arm member and the rearward end of said second lever,
a second spring secured to and extending between said third arm member and the forward end of said second lever,
and means operatively engaging said rear wall and said first lever to yieldably prevent slidable movement of said first lever with respect to said rear wall.

11. The device of claim 10 wherein the rearward end of said second lever has a plurality of holes each of which are adapted to receive one end of said first resilient means at times.

12. The device of claim 10 wherein said third arm member has secured thereto an adjusting screw means which receives one end of said second spring member.

13. The device of claim 10 wherein said first arm member has a plurality of holes therein each adapted to receive one end of said first spring member.

14. The device of claim 10 wherein said means to yieldably prevent slidable movement of said first lever with respect to said rear wall includes at least one notch on said first lever and a vertically rotatable roller cam means adapted to engage said notch at times.

15. The device of claim 10 wherein a first guard member is secured to the top forward surface of said inclined portion and extends upwardly and rearwardly therefrom; said guard member being so angular disposed with respect to said plate member to cause said plate member to pivot downwardly when said first guard member contacts an obstruction when said vehicle is moving forwardly.

16. The device of claim 10 wherein a second guard member is secured to the top surface of said horizontal portion adjacent the rearward end thereof and extends upwardly and forwardly therefrom; said second guard member being so angularly disposed with respect to said plate member to cause said plate member to pivot downwardly when said second guard member contacts an obstruction when said vehicle is moving rearwardly.

17. The device of claim 10 wherein said horizontal portion is adapted to receive a light means thereon and said first and second spring means are adapted to counterbalance the weight of said plate member and said light means.

References Cited by the Examiner
UNITED STATES PATENTS

| | | | |
|---|---|---|---|
| 2,457,211 | 12/1948 | De Smet et al. | 240—7.1 |
| 2,574,057 | 11/1951 | Peterson | 248—380 |
| 2,579,653 | 12/1951 | Dawley | 240—8.18 |
| 3,078,001 | 2/1963 | Young et al. | 217—60 |

CLAUDE A. LE ROY, *Primary Examiner.*

R. P. SEITTER, *Assistant Examiner.*